United States Patent [19]
Fulton

[11] Patent Number: 5,760,519
[45] Date of Patent: Jun. 2, 1998

[54] STATOR FOR ELECTRIC MACHINE AND LAMINATION THEREOF

[75] Inventor: Norman Neilson Fulton, Leeds, England

[73] Assignee: Switched Reluctance Drives Limited, Harrogate, United Kingdom

[21] Appl. No.: 923,833

[22] Filed: Sep. 4, 1997

Related U.S. Application Data

[63] Continuation of Ser. No. 519,974, Aug. 28, 1995, abandoned.

[30] Foreign Application Priority Data

Sep. 16, 1994 [GB] United Kingdom ............... 9418710

[51] Int. Cl.$^6$ .................................................. H02K 33/08
[52] U.S. Cl. ........................................ 310/254; 310/51
[58] Field of Search .................. 310/51, 254, 216, 310/193

[56] References Cited

U.S. PATENT DOCUMENTS

| | | | |
|---|---|---|---|
| 3,149,256 | 9/1964 | Kohlhagen | 310/254 |
| 3,518,473 | 6/1970 | Nordebo | 310/254 |
| 3,995,203 | 11/1976 | Toeroek | 310/166 |
| 4,348,605 | 9/1982 | Toeroek | 310/168 |
| 4,670,696 | 6/1987 | Byrne et al. | 318/701 |
| 4,883,999 | 11/1989 | Hendershot | 310/254 |
| 4,910,475 | 3/1990 | Lin | 310/254 |
| 4,977,344 | 12/1990 | Obradovic | 310/217 |
| 4,993,290 | 2/1991 | Obradovic | 83/32 |
| 5,043,618 | 8/1991 | Stephenson | 310/168 |
| 5,122,697 | 6/1992 | Horst | 310/181 |
| 5,148,090 | 9/1992 | Oku et al. | 310/254 |

FOREIGN PATENT DOCUMENTS

| | | | |
|---|---|---|---|
| 1292740 | 4/1969 | Germany . | |
| 42 12 547 | 4/1992 | Germany | H02K 17/26 |
| 1462451 | 2/1989 | U.S.S.R. | H02K 33/08 |
| 0 180 815 | 5/1986 | United Kingdom | H02P 7/00 |
| 2242073 | 1/1990 | United Kingdom | H02M 1/14 |
| 0 388 476 | 9/1990 | United Kingdom | H02K 19/24 |
| 0 565 840 | 4/1992 | United Kingdom | H02K 19/10 |
| 0 571 314 | 11/1993 | United Kingdom | H02K 19/10 |

OTHER PUBLICATIONS

Stephenson and Blake, *The Characteristics, Design and Applications of Switched Reluctance Motors and Drives*, (Jun. 1993, Nuremberg, Germany).

Primary Examiner—Thomas M. Dougherty
Assistant Examiner—B. Mullins
Attorney, Agent, or Firm—Arnold, White & Durkee

[57] ABSTRACT

A stator for electric machine, in particular a switched reluctance machine, has a non-circular, for example, square, outer profile and a set of equi-angularly spaced stator poles which are angularly arranged to be intermediate radially thickest and thinnest parts of the ring to avoid the poles coinciding with vibrational antinodes of the outer ring. In a particular embodiment the outer profile is square and the stator poles are angularly offset from a line of symmetry drawn through the center of the square at right angles to one pair of opposite sides.

23 Claims, 3 Drawing Sheets

5,760,519

STATOR FOR ELECTRIC MACHINE AND LAMINATION THEREOF

This application is a continuation of application Ser. No. 08/519,974, filed Aug. 28, 1995 now abandoned.

FIELD OF THE INVENTION

Invention relates to a stator for a rotating electrical machine. The invention is particularly, though not exclusively, applicable to a switched reluctance (SR) machine.

BACKGROUND OF THE INVENTION

Rotating electrical machines can be arranged to run as generators or motors. Such machines of various types typically have stator laminations made of electrical sheet steel, having an outer lamination profile (which also constitutes the outer profile perpendicular to the axis of the stator) which is essentially circular, save for small keyways or cut-outs included to facilitate manufacture and/or assembly. The radially inner profile defines the stator teeth which interact with the rotor rotating inside the stator. These circular laminations are packed together, to form the axially extending stator, and mounted in a frame.

Laminations are also known which have a generally rectangular outer profile. These are often used in a so-called 'frameless' construction in which the relatively thicker corners of the stator back iron are used to bear a bolt or other clamping arrangement to hold the laminations together.

In some types of electrical machines, such as switched reluctance machines, a relatively small number of teeth are used and are normally called stator poles. Typically each stator pole is influenced by a coil which is one of a number connected in a group or groups to form machine phases. The selection of the number of poles and the number of coils in a group forming a phase are two of the parameters of machine design. For example, an SR machine with four stator poles could be connected to form two phases each of two coils, as shown in FIG. 1, or an SR machine with twelve stator poles could be connected to form three phases each of four coils, as shown in FIG. 2.

A body can be excited into mechanical resonance by applying an impulsive or periodic force. The amplitude of the resonance vibrations is dependent on the frequency and amplitude of the exciting force and the position at which it is applied, as well as on the material and proportions of the structure.

A body which has a geometrically regular shape will have a well-defined pattern of resonance, usually with a range of frequencies of vibration present at resonance. The points on the body where vibration at a particular frequency gives rise to zero amplitude of vibration are known as nodes. The points at which the amplitude is at maximum are known as anti-nodes.

While it is known in the art of acoustic noise reduction to make the shape of a body irregular to minimize the effects of resonance, there is little or no opportunity to do this with laminations of common forms of electrical machines.

When a phase winding of an SR motor is excited, there is (in addition to the desired torque-producing force) a force generated which acts to pull the energized stator poles towards the center of the machine. This has the effect of distorting the notional circle on which the end faces of the stator poles lie. Thus, successive energization of the phases (in whatever sequence is desired for a particular mode of operation) imparts a periodic radial force to the structure of the laminations. This has the effect of cyclically distorting the laminations, the vibrations thus caused being responsible for producing acoustic noise.

It is an object of the present invention to provide a stator profile and a shape of lamination for a stator in which the tendency to vibration, giving rise to acoustic noise, is reduced.

SUMMARY OF THE INVENTION

According to the present invention there is provided a stator for a rotatable electrical machine, the stator comprising a body defining an outer ring and a plurality of stator poles which project radially inwardly from the ring and partially define a rotor space about an axis of rotation, the ring having a non-circular outer profile perpendicular to the axis of rotation and at least some of the poles being angularly centered with respect to the said axis to be angularly intermediate radially thickest and thinnest parts of the ring to avoid the pole coinciding with a vibrational antinode of the stator ring.

A node of vibration may exist toward the relatively thickest part of the ring, whereas the antinode at which vibration of the greatest amplitude and frequency range occurs will be nearer the relatively thinnest part of the ring. By positioning the pole to be centered away from the antinode, the forces tending to create the acoustic noise are of reduced effect.

Preferably, the outer profile has a line of symmetry passing through the said axis, one of the stator poles being centered angularly offset from the line of symmetry. The offset is desirably about one quarter of the angular stator pole pitch. Preferably, the line of symmetry from which the stator pole is offset is coincident with the radially thinnest part of the ring with respect to the said axis.

While the invention is particularly applicable to simple shapes, such as square profiles and four or eight poles, it is also relevant to any other number of stator poles and phases. For example, the outer profile may be square or hexagonal. The hexagonal outer profile may be used in a three-phase, six pole machine, whereas the square profile may be used in a two-phase, four-pole machine. In general, a regular, even sided, shape of 4n sides (n an integer) is conveniently usable for a machine of n phases or 2n poles. However, the more sides to the polygonal outer profile there are, the more the shape approximates to a circle. The invention is not necessarily limited to regular arrangements of sides.

The stator may be for a switched reluctance machine having windings associated with the poles which are arranged to energize the poles. The stator windings may be arranged so that the stator poles of opposite polarity are disposed on opposite sides of the radially thinnest part of the ring. This is advantageous in a four or an eight stator pole machine. More particularly, this advantage is realized in a 2 phase machine.

Preferably, the stator is made up of a plurality of laminations.

The invention extends to a lamination providing the outer profile and defining the stator poles as defined above.

Furthermore, the invention extends to an electrical machine having a stator as defined above, for example, a switched reluctance machine.

One purpose in offsetting the at least one stator pole is to make irregular the respective symmetries of the ring and the stator poles to reduce the amplitude of vibration at resonance.

BRIEF DESCRIPTION OF THE DRAWINGS

The present invention can be put into practice in various ways some of which will now be described by way of example with reference to the accompanying drawings in which.

DETAILED DESCRIPTION OF THE INVENTION

Figure 3:
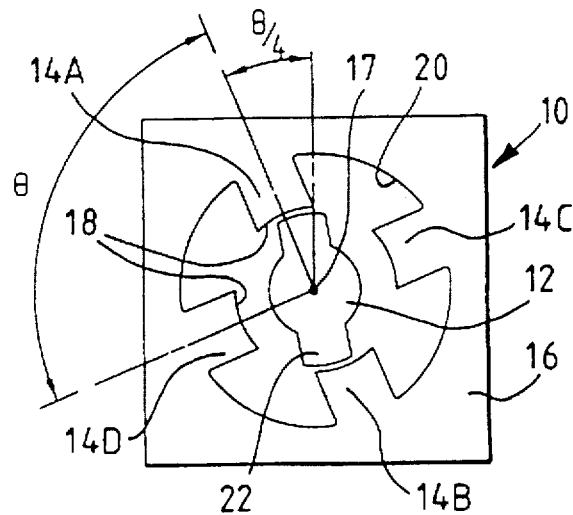
FIG. 3 is a cross-section of a switched reluctance machine according to the invention.

Referring to FIG. 3 of the drawings, a switched reluctance machine, which can be arranged to run either as a generator or a motor, comprises a stator 10 and a rotor 12. The stator 10 is made up of a plurality of laminations of electrical sheet steel. The cross-sectional profile of the stator, in a plane perpendicular to the axis of rotation of the rotor 12, comprises four equi-angularly spaced stator poles 14 which project radially inwardly from a radially outer ring of back iron 16. The outer profile of the stator is square, having a center coincident with the axis 17 of the notional circle on which the radially inner end faces 18 at the poles 14 are arranged. The roots of the stator poles 14 are joined by sections of the ring of back iron 16 defining a circle 20 having a center also coincident with the axis of rotation of the rotor.

Figure 1:
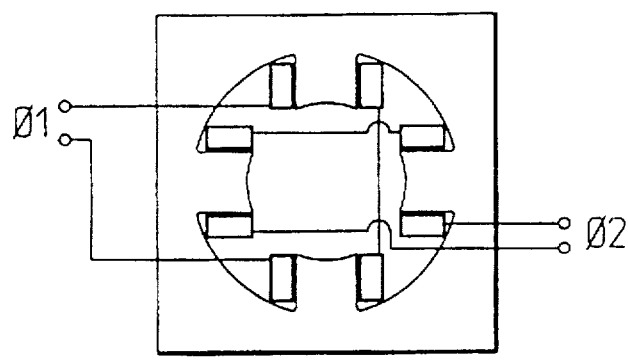
FIG. 1 is a cross-section of a prior art stator for a two-phase switched reluctance machine.
Figure 2:
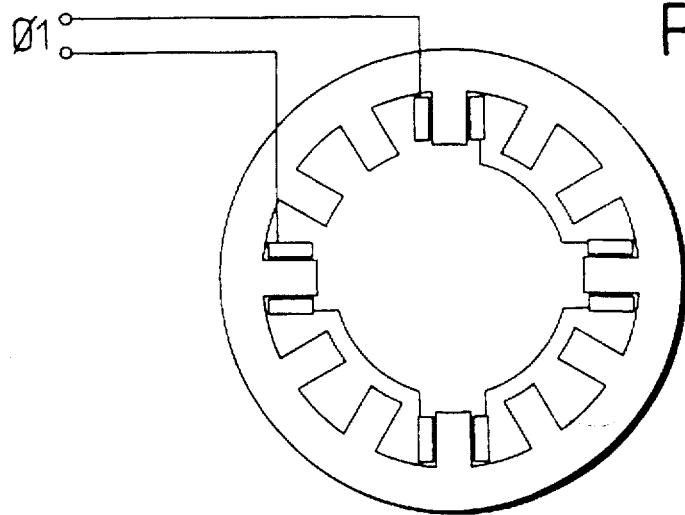
FIG. 2 is a cross-section of a prior art stator for a three-phase switched reluctance machine with only one phase winding shown.

The rotor defines two equiangularly spaced rotor poles 22 which rotate about the axis 17 of the stator pole faces 18. Having a rectangular outer shape, the ring of back iron 16 has relatively thicker and thinner portions relative to the circle 20 from which the poles 14 project. When the poles are arranged symmetrically with respect to the outer profile of the stator (as shown in FIG. 1), the position of the ovalising force pulling on the stator pole coincides with the position at which the antinode would occur if the structure vibrated in response to the ovalising force. In the prior art arrangement, the structure relatively easily achieves substantial resonance in which the amplitude of the vibrations makes the condition noticeable in the presence of relatively small ovalising forces.

In FIG. 3 the angular axis of each stator pole 14 is shifted from a symmetrical position by one quarter of the angle of the pole pitch θ. Thus, the position of the exciting force s asymmetrical to the stator profile, i.e., the angular position of the stator pole is shifted to one intermediate the thickest and thinnest radial extent of the stator back iron and the antinodes of all the low order harmonics are avoided. Thus, for a magnitude of exciting force which is substantially unchanged, the amplitude of the vibration at resonance is reduced which limits the amount of acoustic noise created.

When the outer profile of the stator is substantially square it is possible to use the invention with any number of phases, each phase number having an optimum angular position for the stator pole between adjacent thickest and thinnest portions on the back iron.

Figure 4:
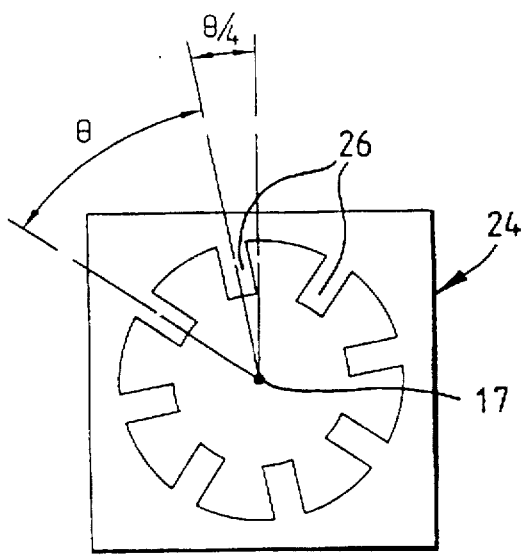
FIG. 4 is a cross-section of an alternative embodiment of a stator according to the invention.

FIG. 4 shows an eight pole machine stator 24 having a square outer profile. Stator poles 26 are angularly offset θ/4 from the thinnest portion of the back iron which corresponds to a line of symmetry passing through the center 17.

Figure 5:
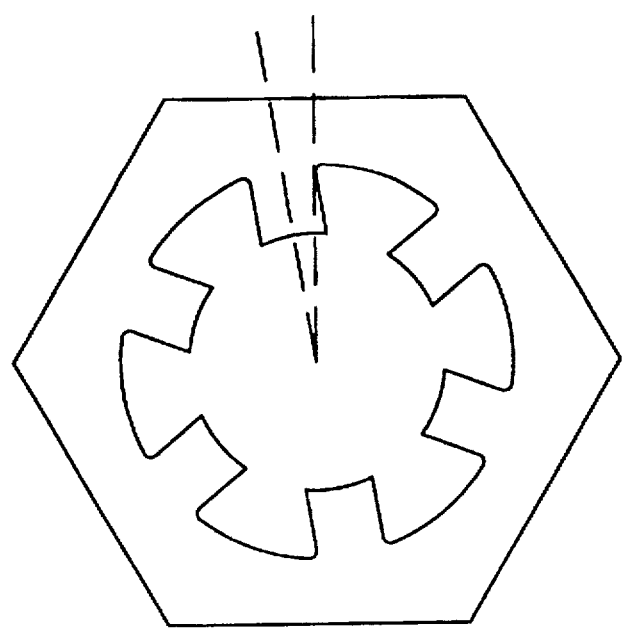
FIG. 5 illustrates a three-phase machine in accordance with the present invention having a hexagonally profiled stator.

Similarly, where the number of phases is greater than two and the outer profile has more than four sides, the invention may be used, positioning each stator pole at a position θ/4 from the thinnest part of the back iron. For example, a three-phase machine having an hexagonally profiled stator will have the position of each stator pole arranged to be between the relatively thinner and thicker portions of the back iron, e.g. shifted θ/4. Such a machine is illustrated in FIG. 5.

There is a further benefit of the invention which accrues when certain pole and phase number combinations are used with certain outer profiles, for example, a two-phase machine with four or eight poles and a substantially square outer profile. In FIGS. 3 and 4, sections of the back iron of the stator are effectively narrower than other parts. When one phase of the machine is excited this gives rise to a higher flux density in those sections than in other sections. This would normally be considered to be a limiting aspect of the design. There is the opportunity, however, to reduce this disadvantage by connecting the phase windings to the supply with a particular polarity.

The coil (not shown) around pole 14A of FIG. 3 is connected to the supply so as to produce a 'north' pole and the coil around the pole 14B produces a 'south' pole. There is then a choice as to the connection of poles 14C and 14D. Either pole 14C is connected to produce a 'north' pole and pole 14D will then be a 'south' pole, so that like polarities are on opposite sides of the narrow part of the back of iron. Alternatively, pole 14C is connected to produce a 'south' pole and pole 14D will then be a 'north' pole, so that opposite polarities are on opposite sides of the narrow section. If the machine is connected in the latter fashion and operated with an excitation pattern which involves flux existing simultaneously in both phases, then flux wave forms are produced which have lower flux densities in the narrow section. This leads to lower excitation requirements and lower iron losses than would have been the case if the machine and been connected in the former fashion.

Various embodiments of the invention have been described by way of example. Those skilled in the art will recognize that many variations may be made without departing from the present invention. Accordingly, the above description of several embodiments is made by way of example and not for purposes of limitation. The present invention is intended to be limited only by the spirit and scope of the following claims.

I claim as my invention:

1. A stator for a rotatable electric machine comprising a stack of non-circular laminations that define a plurality of equi-angularly spaced, inwardly extending, stator poles, each stator pole defining a stator pole center-line, wherein opposing pairs of stator poles are adapted to be simultaneously energized during operation of the machine, wherein the outer profile of the stack of non-circular laminations defines at least one line of symmetry, wherein the stator pole center-lines of each opposing pair of stator poles are angularly offset from each line of symmetry defined by the outer profile and wherein the angular distance between each line of symmetry and the center-line of a given stator pole adjacent the line of symmetry is different from the angular distance between the line of symmetry and the center-line of each stator pole adjacent the given stator pole.

2. A stator as claimed in claim 1 in which the outer profile of the stator defines an outer ring having radially thick and radially thin portions and at least one line of symmetry from which the stator pole center-lines of opposing pairs of stator poles are offset is coincident with a radially thin portion of the ring.

3. A stator as claimed in claim 1 in which the outer profile is square.

4. A stator as claimed in claim 3 including four poles.

5. The stator as claimed in claim 1 in which the outer profile is hexagonal.

6. A stator as claimed in claim 5 including six poles.

7. A stator as claimed in claim 1, in which the outer profile has the same number of sides as poles.

8. The stator on claim 1 wherein the center-lines of each opposing pair of stator poles are asymmetric with respect to the outer profile of the stator.

9. A lamination for a stator for a rotatable electric machine, the lamination comprising a ferromagnetic body defining an outer ring and a plurality of equally-spaced stator pole profiles which project radially inwardly from the ring and partially define a rotor space about an axis, each pole profile defining a pole center-line, the outer ring having radially thick and radially thin portions and the outer ring having a non-circular outer profile perpendicular to said axis that defines at least one line of symmetry and at least some of the pole center-lines being arranged to be angularly intermediate a radially thick portion and a radially thin portion of the ring such that the arrangement of the stator poles is asymmetric with respect to each line of symmetry defined by the outer profile of the stator.

10. A lamination as claimed in claim 9 in which the outer profile has a line of symmetry passing through the said axis, at least one of the stator pole profiles being angularly offset from the line of symmetry.

11. A lamination as claimed in claim 10 in which the line of symmetry from which the pole center-line are offset is coincident with a radially thin portion of the ring with respect to the said axis.

12. A lamination as claimed in claim 9, 10 or 11 in which the outer profile has n sides and n pole profiles (n an integer).

13. An electric machine comprising:

a rotor defining a plurality of outwardly projecting rotor poles;

a stator comprising a stack of non-circular laminations that define a plurality of equiangularly spaced, inwardly extending, stator poles, each stator pole defining a center-line wherein the angular distance between adjacent stator poles defines a pole pitch; and at least one phase winding positioned within the stator and adapted to simultaneously energize opposing pairs of stator poles;

wherein the outer profile of the stack of non-circular laminations defines at least one line of symmetry, and wherein the center-lines of each opposing pair of stator poles are angularly offset from the line of symmetry by an amount approximately equal to one-quarter of the pole pitch.

14. A machine as claimed in claim 13 in which the stator defines an outer ring and the axis of symmetry from which the center-lines of the opposing pair of stator poles are offset is coincident with the radially thinnest part of the ring.

15. A machine as claimed in claim 14 in which stator pole of opposite polarity are disposed on opposite of the thinnest part of the ring.

16. A machine as claimed in claim 13 including phase windings defining n phase, the profile having 2n sides and 2n poles (n an integer).

17. The machine of claim 13 wherein the outer profile of the stack of non-circular lamination defines a plurality of axis of symmetry and wherein the stator pole center-lines of each opposing pair of stator poles are offset from each axis of symmetry.

18. The machine of claim 13 wherein the outer profile of the stack of non-circular laminations defines a plurality of axis of symmetry, wherein the machine includes a plurality of phase windings, each phase winding adapted to energize at least one pair of opposing stator poles, and wherein each center-line of each stator pole is offset from each axis of symmetry.

19. A machine as claimed in claim 13 wherein the machine includes a plurality of phase windings, wherein each phase winding is adapted to energize at least one pair of opposing stator poles, and wherein the machine is constructed and arranged to run as a reluctance machine.

20. The machine of claim 13 wherein the center-lines of at least some of the opposing pair of stator poles are asymmetric with respect to the outer profile of the stator.

21. A stator for a rotatable electric machine, the stator comprising a body defining an outer ring and a plurality of stator poles which project radially inwardly from the ring and partially define a rotor space about an axis, each stator pole defining a center-line, the ring having a non-circular outer profile perpendicular to the said axis defining radially thick and thin portions and at least one line of symmetry passing through said axis, each stator pole center-line being angularly intermediate thick and thin portions of the ring and being angularly offset from the line of symmetry of the ring such that the angular distance between the center-line of each stator pole and each line of symmetry is different from the angular distance between the center-line and each adjacent stator pole.

22. A stator for a rotatable electric machine, the stator comprising:

a body defining an outer ring, the outer ring defining a first pattern of symmetry having at least one line of symmetry; and a plurality of stator poles which project from the ring, each stator pole defining a center-line, and the center-lines of the stator poles defining a second pattern of symmetry having at least one line of symmetry;

wherein the stator poles are arranged with respect to the body such that: (i) the first pattern of symmetry is offset from the second pattern of symmetry and (ii) there is no alignment between any line of symmetry defined by the first pattern and any line of symmetry defined by the second pattern.

23. The stator of claim 22 wherein the stator poles are separated from one another by a given pole pitch and wherein a line of symmetry defined by the first pattern of symmetry is offset from a line of symmetry defined by the second pattern of symmetry by an amount equal to approximately one-quarter of the pole pitch.

* * * * *